United States Patent [19]
Haas

[11] 3,792,760
[45] Feb. 19, 1974

[54] THROTTLE OVERRIDE CONTROLLED BY BRAKE SYSTEM

[75] Inventor: Ronald H. Haas, Okemos, Mich.

[73] Assignee: General Motors Corporation, Detroit, Mich.

[22] Filed: Dec. 11, 1972

[21] Appl. No.: 313,814

[52] U.S. Cl. ................................ 192/3 M, 192/3 R
[51] Int. Cl. ...................... F16d 67/00, F16d 71/00
[58] Field of Search .......... 192/3 R, 3 T, 3 M, 3 TR

[56] References Cited
UNITED STATES PATENTS

| | | | |
|---|---|---|---|
| 3,495,692 | 2/1970 | Holoate | 192/3 R |
| 2,911,078 | 11/1959 | Baker | 192/3 R |
| 2,311,120 | 2/1943 | Mossinghoff | 192/3 R |
| 2,066,667 | 1/1937 | Bellis | 192/3 T X |

Primary Examiner—Benjamin W. Wyche
Assistant Examiner—Lance W. Chandler
Attorney, Agent, or Firm—Arthur N. Krein

[57] ABSTRACT

A throttle override for a conventional throttle controlled internal combustion engine wherein an additional valve is positioned in the engine induction passage and is operable by the brake system of the vehicle to control the flow of air in the induction passage.

4 Claims, 2 Drawing Figures

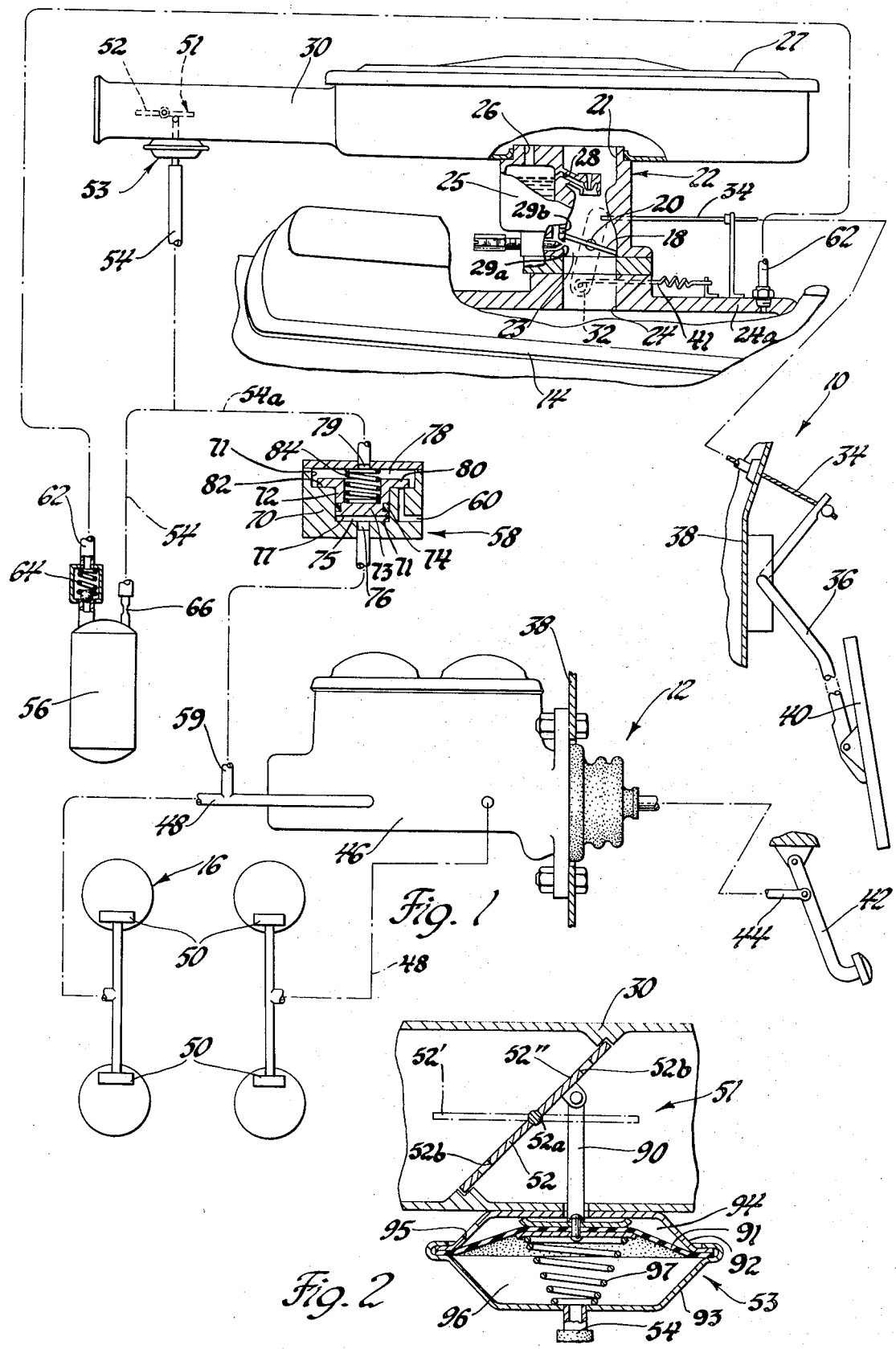

THROTTLE OVERRIDE CONTROLLED BY BRAKE SYSTEM

The present invention relates to a throttle control for an internal combustion engine and more particularly to a throttle override mechanism for a vehicle to control the flow of air to the engine as a function of brake actuation.

During normal vehicle operation, it is customary to decelerate the engine before effecting vehicle braking, but under certain conditions, this is not always possible. There may therefore be times when the throttle may not be returned to an idle or low idle position before vehicle braking is required, and, under these conditions, the engine will be still operating to power the vehicle forward at the same time the operator is attempting to brake the vehicle to a stop. This latter condition will frequently occur, for example, with drivers who use their left foot for braking since their right foot may still be on the accelerator pedal holding the throttle valve open as they attempt to brake with their left foot.

It is therefore an object of this invention to provide an engine speed control operable upon vehicle braking to control air flow to the engine in lieu of this air flow being controlled by the throttle valve.

It is another object of this invention to provide an engine speed control wherein, in addition to the primary throttle valve for normally controlling the air flow in an engine air induction passage, a secondary air flow valve therein is operatively connected with and closed by the vehicle braking system when actuated to effect rapid vehicle deceleration.

It is a further object to provide an engine speed control of the foregoing type wherein the secondary air flow valve is power actuated by a vacuum motor when selectively vented by a control valve on application of a predetermined braking force to a vehicle braking system.

These and other objects of the invention are attained by means of an air flow control valve positioned in the air induction passage of the engine upstream of the throttle valve in an internally vented carburetor. The air flow valve is normally biased to a closed position by a spring and held open during normal engine operation by a differential fluid pressure actuated motor connected to the vehicle vacuum system. The air flow valve is closed by the differential fluid pressure actuated motor when vented through a control valve actuated hydraulically by the vehicle brake system when operated above a predetermined pressure so as to effect rapid vehicle deceleration.

For a better understanding of the invention, as well as other objects and further features thereof, reference is had to the following detailed description taken in conjunction with the accompanying drawings, wherein:

FIG. 1 is a view partially in schematic and partially in cross section with parts broken away of a vehicle throttle control system provided in accordance with the present invention; and FIG. 2 is a sectional view of the air flow control valve and its power actuator of the throttle control system of FIG. 1.

With reference now to FIG. 1, there is shown a throttle pedal linkage 10 and a vehicle braking system 12 for respectively permitting an operator of a vehicle to control the internal combustion engine 14 of the vehicle and to brake the set of vehicle wheels 16.

Throttle pedal linkage 10 includes a primary throttle valve 18 that is pivotable by a throttle shaft 20 in the throttle bore 21 of a carburetor 22 and that is normally controlled by the vehicle operator to regulate the delivery of an air-fuel flow to an induction passage 23 communicating with an induction passage 24 in the intake manifold 24a of engine 14. Carburetor 22 includes a float bowl 25 internally vented by a vent 26 to air flow in an air cleaner 27 and is operative to provide through primary fuel delivery passage 28 and idle port 29a and off idle delivery port 29b a fuel flow mixed in throttle bore 21 with air admitted through an air intake 30 of the air cleaner 27. Throttle shaft 20 is pivoted by a throttle lever 32 that is connected by a sheathed throttle cable 34 to a pedal lever 36 pivotably supported on a vehicle firewall 38. Suspended from firewall 38 by pedal lever 36 is a vehicle throttle pedal 40 which, with an actuating force applied thereto, is operative to pivot throttle valve 18 in a clockwise throttle opening direction from an idle position to a full open position. A return spring 41 is connected to bias throttle lever 32 to normally return throttle valve 18 to its idle position upon removal of the actuating force from vehicle throttle pedal 40.

Vehicle braking system 12 includes a vehicle brake pedal 42 actuatable on application of an actuating force thereto to move a piston rod 44 operatively associated with a hydraulic pump and reservoir unit 46 to pump hydraulic fluid through a plurality of brake lines 48 to a set of front and rear vehicle wheel brakes 50 and to increase the pressure of hydraulic fluid in brake lines 48 so as to effect braking of wheels 16 by brakes 50.

The hereinabove described throttle pedal linkage 10, vehicle braking system 12, and internally vented carburetor 22 may be of the conventional type as provided on certain commercially available passenger car vehicles.

Looking now to the throttle override system of the present invention, to provide a secondary control of the air flow to engine 14 in addition to the primary control normally provided by throttle valve 18, there is mounted in air inlet 30, upstream of throttle valve 18, and movable therein between an opened and a closed position, a fluid pressure differential operated engine speed reducer air inlet device 51. This device includes a secondary air flow control valve 52 in air inlet 30 operated by a vacuum motor 53. The vacuum motor 53 is connected by a conduit 54 to a source of vacuum such as an engine vacuum accumulator 56 and is controlled by a control valve 58 in a branch conduit 54a of conduit 54, the control valve 58 having a vent passage 60 for selectively communicating a chamber of the vacuum motor 53 to the atmosphere. Operation of the control valve 58 is by means of hydraulic fluid pressure with the control valve connected to the hydraulic brake line 48 by a tap line 59 so that vacuum motor 53 may be rapidly vented when a predetermined hydraulic fluid brake pressure for effecting rapid vehicle deceleration is established in brake system 12.

To store vacuum provided by the engine vacuum system, engine vacuum accumulator 56 is connected to the induction manifold 24a of engine 14 by a conduit 62 and a one-way check valve 64, the latter being operative to permit communication with the vacuum system only when the pressure in engine vacuum accumulator 56 is greater than that in the induction passage 24.

Conduit 54 includes a flow restriction 66 to retard the loss of vacuum stored in engine vacuum accumulator 56 when vent passage 60 is opened to place a chamber of the vacuum motor 53 in communication with the atmosphere.

Control valve 58 is a hydraulically actuated valve comprising a valve body 70 having a stepped bore 71 therein to slidably receive a valve and piston member 72. A piston portion 73 of this member 72 is reciprocal in the reduced diameter portion of stepped bore 71 and is sealed therein by an O-ring seal 74 positioned in an annular groove provided for this purpose in piston portion 73. The valve and piston member 72 is actuated by hydraulic fluid supplied to the variable volume hydraulic chamber 75 through a control port 76 in the valve body connected to hydraulic brake line 48 by the tap line 59, variable volume chamber 75 being defined by a pressure responsive surface 77 on the bottom of piston portion 73 and the reduced diameter portion of bore 71. The enlarged bore portion of stepped bore 71 in valve body 70 forms an air chamber 78 in communication with vacuum motor 53 via port 79 in the valve body 70 and by conduit 54 and is selectively placed in communication with the atmosphere via the vent passage 60, the flow of fluid through which is controlled by the annular flange valve portion 80 of valve and piston member 72, flange valve portion 80 being positioned to engage a valve seat provided by a radial shoulder 82 in the valve body 70 between the bores of stepped bore 71. The flange valve portion 80 is normally biased to seat against radial shoulder 82 by means of a spring 84, unseating being effected by hydraulic fluid pressure, as desired, acting on the piston portion 73 of the valve and piston member 72.

So that vent 60 is opened only when rapid vehicle deceleration is desired, the force of spring 84 and the surface area of surface of piston portion 73 are selected to effect valve operation only when the pressure in brake line 48 attains that associated with severe vehicle braking, such as for example which might be experienced in making a sudden, rapid stop from relatively high speed. Thus, in a braking system of one design, severe braking such as to effect a rapid vehicle deceleration of 15-18 feet per second (ft/sec$^2$) may be effected by brake line pressure of from, for example, 400 to 500 pounds per square inch (psi). In this example the spring rate and surface area of the piston portion 73 are selected to permit opening of vent 60 when the brake line pressure exceeds, for example, 400 pounds per square inch.

Air flow control valve 52 is pivotably supported by valve shaft 52a in air intake 30 and is vacuum-opened to establish an open condition 52', shown in broken outline in FIG. 2, wherein a normal flow of air for providing a normal air-fuel mixture is drawn into air intake 30 and delivered to induction passage 24 under the control of throttle valve 18 and alternatively spring-closed to a closed condition 52" wherein the flow of air is throttled so that the resulting air-fuel flow limits the speed of engine 14 to an idling speed.

To normally establish valve 52 in the open condition 52', secondary air flow control valve 52, as may be better understood with reference to FIG. 2, is pivotably connected by an actuator rod 90 to the diaphragm 91 of vacuum motor 53, which is suitably mounted on the exterior of air intake 30. Vacuum motor 53 comprises a housing made of two generally cup-shaped halves 92 and 93 with the periphery of the diaphragm 91 secured therebetween to define an upper chamber 94 vented to the atmosphere through an aperture 95 in the housing half 92 and a lower chamber 96 connected to a source of vacuum by conduit 54. A spring 97 is positioned in chamber 96 abutting at one end against housing half 93 and at its other end against diaphragm 91 to normally bias the diaphragm in one direction, upward as shown in FIG. 2, to normally move valve 52 to a closed position 52".

To permit engine idling when the secondary valve 52 is closed, clearance can be provided between secondary valve 52 and the interior of air intake 30 to provide for suitable air flow or, as shown, the secondary valve 52 can be provided with flow apertures 52b of the desired size for the flow of sufficient air to the engine to maintain its operation at an idling speed.

OPERATION

With throttle pedal linkage 10 normally operative to control the speed of engine 14 by controlling a normal air-fuel flow thereto, throttle valve 18 is normally returned to its idle position by return spring 41 upon removal of actuating force from throttle pedal 40. With brake system 12 not actuated with a predetermined braking force, spring 84 biases valve and piston member 72 of the control valve 58 to normally close vent passage 60 so that the force effected on diaphragm 91 by the pressure differential on opposite sides thereof overcomes the bias thereon of spring 84 to move rod 90 downward as seen in FIG. 2 to rotate secondary valve 52 to the open position 52".

Actuation of brake pedal 42 with a predetermined force to effect rapid vehicle deceleration increases the hydraulic brake line pressure discharged from hydraulic pump unit 46 to act on surface 77 of valve and piston member 72 to overcome the bias of spring 84 to unseat the valve portion 80 of valve and piston member 72 from shoulder 82. Vent passage 60 is thereby opened for flow of atmospheric air to the lower chamber of vacuum motor 53 through conduit 54a and port 79. When the pressure differential on opposite sides of diaphragm 91 decreases, secondary valve 52 will be closed by spring 84 to establish the closed condition 52" for returning the speed of engine 14 to the idling speed by restricting the flow of air to the engine irrespective of the position of throttle valve 18. If throttle valve 18 is open when secondary air flow valve 52 is closed upon application of the predetermined braking force, carburetor 22 continues to operate as a conventional internally vented carburetor in providing an air-fuel flow sufficient to idle engine 14 with fuel being supplied from the idle and off idle ports of the carburetor.

Engine 14 is thus returned to an idling condition whenever a braking force above a predetermined amount is applied to the vehicle braking system, and such return to idling is effected whether the vehicle operator inadvertently holds the throttle valve 18 open or not. Thus, the engine would be similarly returned to the idling condition even if the throttle pedal linkage 10 or return spring 41 should for some reason not effect a normal return of throttle valve 18 to its idle position on removal of actuating force from throttle pedal 40. Upon removal of a predetermined actuating force from vehicle brake pedal 42, the hydraulic pressure in brake line decreases to allow spring 84 to close off vent passage 60, thereby allowing vacuum motor 53 to be actuated to move air valve 52 to the open position 52' with air flow to the engine then controlled by throttle valve 18.

Having described one embodiment of the present invention, it is understood that the specific terms and examples are employed in a descriptive sense only and not for the purpose of limitation. Other embodiments of the invention, modifications therof, and alternatives thereto may be used. For example, it is apparent to those skilled in the art that control valves of different designs than that of the control valve 58 described may be employed to control the power actuator 53 so as to effect a rapid closure of valve 52 on severe vehicle braking. For example, a conventional spool type valve, hydraulic power actuated, may be used in lieu of the control valve 58 shown, as would be apparent to those skilled in the art and moreover the control valve may also be of the type operated electrically or pneumatically by signals provided by the vehicle braking system in response to the application of a predetermined force thereto. I therefore aim in the appended claims to cover such modifications and changes as are within the true scope and spirit of my invention.

What is claimed is:

1. In a vehicle having an operator controlled hydraulic fluid braking system with a hydraulic fluid outlet and an internal combustion engine having a source of engine vacuum, and a carburetor having an air induction passage and an operator controlled throttle valve therein for normally regulating the air-fuel flow to the engine:
   a. an air valve movably mounted in said air induction passage for movement between a first position and a second position;
   b. differential fluid pressure actuated power means, including at least a first chamber said differential fluid pressure actuated power means being connected to said air valve to effect movement thereof from said first position to said second position upon application of said engine vacuum to said first chamber and to effect movement of said air valve from said second to said first position when said first chamber is in communication with atmosphere; and
   c. valve controlled conduit means including a hydraulic pressure responsive valve normally connecting said source of engine vacuum to said first chamber of said differential fluid pressure actuated power means and operable to connect said first chamber to the atmosphere when said hydraulic fluid pressure responsive valve is actuated by a predetermined hydraulic fluid pressure, said fluid pressure responsive valve being operatively connected to said hydraulic fluid outlet of said vehicle braking system.

2. In a vehicle according to claim 1, wherein said differential fluid pressure actuated power means further including a diaphragm to form said first chamber and a second chamber, said second chamber being in communication with the atmosphere and being separated from said first chamber by said diaphragm which is operatively connected to said air valve to effect movement thereof from said first position to said second position upon application of said engine vacuum to said first chamber and a spring operatively connected to said air valve to effect movement thereof from said second position to said first position when said first chamber is in communication with the atmosphere.

3. In a vehicle having an operator controlled hydraulic fluid braking system with a hydraulic pressure fluid outlet, and an internal combustion engine having a source of engine vacuum, a carburetor having an air induction passage and an operator controlled throttle valve movable therein to normally regulate the air flow to said engine;
   a. an air valve movably mounted in said air induction passage upstream of the throttle valve for movement between a first position and a second position;
   b. differential fluid pressure actuated power means including a housing having first and second chambers therein separated by a diaphragm, said second chamber being in communication with the atmosphere, said diaphragm being connected to said air valve to effect movement thereof from said first position to said second position upon application of vacuum pressure to said first chamber, and a spring positioned in said first chamber in abutment against said diaphragm to effect movement of said air valve from said second position to said first position when said first chamber is in communication with the atmosphere;
   c. engine vacuum accumulator means operatively connected to said source of engine vacuum;
   d. valve controlled conduit means connected to said engine vacuum accumulator means and in communication with said first chamber, said valve controlled conduit means including an air flow restriction and a hydraulic fluid pressure responsive valve having a valve body having a bore and a passage one end of which is in communication with the bore and the other end of which is in communication with the atmosphere, a valve and piston member including a valve portion and a piston portion slidably positioned in said bore, and biasing means positioned in said bore to cause said valve portion of said valve and piston member to normally close said passage, said hydraulic fluid pressure responsive valve being operatively connected to said hydraulic pressure fluid outlet of said braking system for actuation of said piston portion of said valve and piston member to connect said first chamber to the atmosphere via said passage in response to a predetermined hydraulic fluid pressure at said outlet, said flow restriction being positioned between said engine vacuum accumulator means and said hydraulic fluid pressure responsive valve.

4. In a vehicle having an operator controlled hydraulic fluid braking system with a hydraulic fluid outlet, and an internal combustion engine having a source of engine vacuum, a carburetor having an air induction passage, an operator con-trolled throttle valve for regulating the air-fuel flow to said engine, and an air cleaner having an air intake passage mounted on said carburetor for delivering clean air to said air induc-tion passage;
   a. an air valve pivotably mounted in said air intake passage for movement between an open position allowing a normal air delivery to said engine and an air flow reducing position restricting the air flow to said engine;
   b. differential fluid pressure actuated power means, including first and second chambers, operatively connected to said air valve to effect movement thereof from said air flow reducing position to said open position upon application of vacuum to said first chamber and to allow movement of said air valve from said open position to said air flow reducing position when said first chamber is in communication with the atmosphere;
c. engine vacuum accumulator means;
d. first conduit means connecting said source of engine vacuum to said engine vacuum accumulator means;
e. second conduit means connecting said engine vacuum accumulator means to said differential fluid pressure actuated means in communication with said first chamber and including a flow restriction therebetween; and
f. a hydraulic fluid pressure responsive valve including a valve body having a stepped bore therein and a valve and piston member reciprocally received in said stepped bore to define therewith an air chamber and a hydraulic chamber said stepped bore having an enlarged diameter portion, a reduced diameter portion, and a radial shoulder therebetween, an aperture in said valve body extending at one end through said shoulder and communicating at its opposite end with the atmosphere, said enlarged diameter portion of said stepped bore being connected with said second conduit between said flow restriction and said differential fluid pressure actuated means a spring positioned in said air chamber for causing said valve and piston member to normally seat on said shoulder to close said aperture, said reduced diameter portion of said stepped bore being connected to said hydraulic fluid outlet of said vehicle braking system, and said valve and piston member having a pressure responsive surface in said hydraulic chamber.

* * * * *